US009405013B2

(12) United States Patent
Diggelen et al.

(10) Patent No.: US 9,405,013 B2
(45) Date of Patent: *Aug. 2, 2016

(54) METHOD AND SYSTEM FOR REDUCING AUTONOMOUS TIME TO FIX A MULTI-STANDARD GNSS RECEIVER

(71) Applicant: Broadcom Corporation, Irvine, CA (US)

(72) Inventors: Frank van Diggelen, San Jose, CA (US); Charles Abraham, Los Gatos, CA (US)

(73) Assignee: Broadcom Corporation, Irvine, CA (US)

( * ) Notice: Subject to any disclaimer, the term of this patent is extended or adjusted under 35 U.S.C. 154(b) by 188 days.

This patent is subject to a terminal disclaimer.

(21) Appl. No.: 13/960,395

(22) Filed: Aug. 6, 2013

(65) Prior Publication Data

US 2014/0022122 A1 Jan. 23, 2014

Related U.S. Application Data

(63) Continuation of application No. 13/046,497, filed on Mar. 11, 2013, now Pat. No. 8,525,726.

(60) Provisional application No. 61/387,301, filed on Sep. 28, 2010.

(51) Int. Cl.
*G01S 19/31* (2010.01)
*G01S 19/09* (2010.01)
(Continued)

(52) U.S. Cl.
CPC .............. *G01S 19/31* (2013.01); *G01S 19/28* (2013.01); *G01S 19/33* (2013.01)

(58) Field of Classification Search
USPC ............. 342/357.21, 357.46, 357.63, 357.66, 342/357.71; 701/468, 470
See application file for complete search history.

(56) References Cited

U.S. PATENT DOCUMENTS

2008/0117103 A1 5/2008 Wang et al.
2008/0180320 A1 7/2008 Tysowski
(Continued)

FOREIGN PATENT DOCUMENTS

EP 2 187 228 A1 5/2010
EP 2 267 473 A2 12/2010
(Continued)

OTHER PUBLICATIONS

European Search Report for European Patent Application No. EP 11007815.1, European Patent Office, Munich, Germany, dated Mar. 15, 2012.

*Primary Examiner* — Dao Phan
(74) *Attorney, Agent, or Firm* — Sterne, Kessler, Goldstein & Fox PLLC

(57) ABSTRACT

A multi-standard GNSS receiver, handle different global navigation satellite systems (GNSSs), determines with respect to a current time instant, the earliest broadcast timing based on corresponding satellite broadcast cycles for satellites in the different GNSSs. The multi-standard GNSS receiver acquires broadcast ephemeris at the determined earliest broadcast timing to determine its own first position. A search order is determined based on the corresponding satellite broadcast cycles and the current time instant. The multi-standard GNSS receiver may selectively utilize appropriate satellite receivers such as the GPS receiver and the GLONASS receiver to search for satellite signals based on the determined search order. Channels for different GNSSs are scanned to identify transmitting satellites based on the corresponding satellite broadcast cycles for ephemeris downloading. The satellite search is prioritized by comparing the current time instant with the corresponding satellite broadcast cycles.

20 Claims, 4 Drawing Sheets

(51) Int. Cl.
*G01S 19/28* (2010.01)
*G01S 19/33* (2010.01)

(56) References Cited

U.S. PATENT DOCUMENTS

2008/0284646 A1* 11/2008 Walley et al. ............ 342/357.09
2009/0278741 A1   11/2009 Miyata 2011/0037650 A1   2/2011 Lennen
2011/0102260 A1   5/2011 Morrison
2012/0075144 A1   3/2012 Diggelen et al.

FOREIGN PATENT DOCUMENTS

EP    2 280 292 A1    2/2011
JP    2009-270929 A   11/2009

* cited by examiner

METHOD AND SYSTEM FOR REDUCING AUTONOMOUS TIME TO FIX A MULTI-STANDARD GNSS RECEIVER

CROSS REFERENCE TO RELATED APPLICATIONS

This application is a continuation of U.S. application Ser. No. 13/046,497, filed Mar. 11, 2011. titled "Method and System for Reducing Autonomous Time to Fix of a Multi-Standard GNSS Receiver," now U.S. Pat. No.: 8,525,726, which claims benefit of U.S. Provisional Application No. 61/387,301, filed Sep. 28, 2010, titled "Method and System for Reducing Autonomous Time to Fix of a Multi-Standard GNSS Receiver," the contents of all of which are incorporated herein by reference in their entirety.

FIELD OF THE INVENTION

Certain embodiments of the invention relate to signal processing for global navigation satellite systems (GNSS). More specifically, certain embodiments of the invention relate to a method and system for reducing autonomous time to fix of a multi-standard GNSS receiver.

BACKGROUND OF THE INVENTION

The Global Positioning System (GPS), the Global Navigation Satellite System (GLONASS), the satellite navigation system GALILEO, the COMPASS system, and the Quasi-Zenith Satellite System (QZSS) are examples of Global Navigation Satellite Systems (GNSS). A GNSS utilizes an earth-orbiting constellation of a plurality of satellites each broadcasting signals which indicates its precise location and ranging information. From any location on or near the earth, GNSS receivers may normally determine their navigation information by acquiring the satellite signals broadcast from the plurality of GNSS satellites. The time to first fix, that is position computation, is enhanced when a GNSS receiver has prior access to a model of satellite orbits and clocks. This model is broadcast by satellites and is often referred to as ephemeris or ephemeris data. The ephemeris is broadcast to GNSS receivers as part of GNSS broadcasting signals or navigation messages. Different GNSS systems may broadcast corresponding ephemeris utilizing different satellite broadcast cycles. For example, a GPS satellite broadcasts the GPS ephemeris in three six second blocks repeated every 30 seconds. A GLONASS satellite broadcasts the GLONASS ephemeris in an 8 second block repeated every 30 seconds. The broadcast ephemeris comprises navigational information of transmitting GNSS satellites. The satellite navigational information comprises standard satellite orbit models, clock model, and/or information about the operational status of the related GNSS satellites. The broadcast ephemeris is typically valid for a limited period of time such as 2 to 4 hours into the future, from the time of broadcast. Before the end of the period of validity, the GNSS receiver needs to obtain a fresh broadcast ephemeris to continue operating to produce an accurate position fix and/or velocity of the GNSS receiver.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for reducing autonomous time to fix of a multi-standard GNSS receiver, substantially as illustrated by and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF THE DRAWINGS/FIGURES

DETAILED DESCRIPTION OF THE INVENTION

Certain embodiments of the invention may be found in a method and system for reducing autonomous time to fix of a GNSS receiver. In various embodiments of the invention, a multi-standard global navigation satellite system (GNSS) receiver, which is operable to handle a plurality of different global navigation satellite systems (GNSSs), may determine with respect to a current time instant, the earliest time for acquiring fresh broadcast ephemeris from one of the plurality of different GNSSs based on corresponding satellite broadcast cycles for satellites in same GNSS and/or satellites in different GNSSs. The multi-standard GNSS receiver may acquire the fresh broadcast ephemeris at the determined earliest time instant, and utilize the acquired fresh broadcast ephemeris to determine its own first position. A search order, which is used to determine the order in which the satellites are to be searched, may be determined for the multi-standard GNSS receiver based on the corresponding satellite broadcast cycles and the current time instant. The multi-standard GNSS receiver may selectively utilize appropriate satellite receivers to search for signals from the satellites in the different GNSSs based on the determined search order. The satellite broadcast cycles may be associated with channels for different GNSS satellite systems. The multi-standard GNSS receiver may scan the channels to identify one or more transmitting GNSS satellite based on the corresponding satellite broadcast cycles. The multi-standard GNSS receiver may download the fresh broadcast ephemeris from the identified one or more transmitting GNSS satellite to determine its own first position. In some instances, the current time instant may be compared with the corresponding satellite broadcast cycles to prioritize a manner in which the multi-standard GNSS receiver may acquire the fresh broadcast ephemeris from the corresponding satellites.

Figure 1:
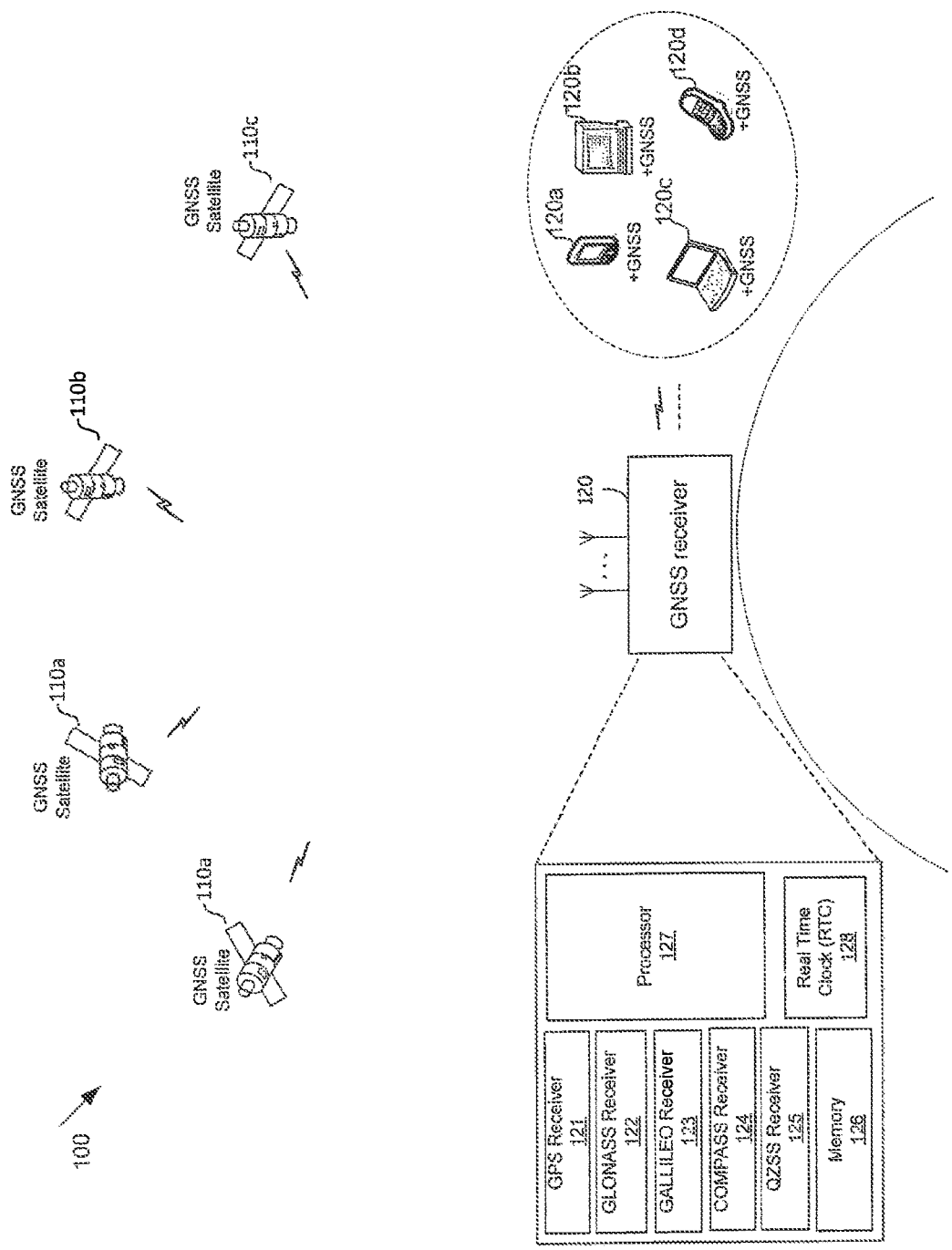
FIG. 1 is a diagram illustrating an exemplary communication system that is operable to utilize autonomous time to fix performance of a multi-standard GNSS receiver, in accordance with an embodiment of the invention.

FIG. 1 is a diagram illustrating an exemplary communication system that is operable to reduce autonomous time to fix of a multi-standard GNSS receiver, in accordance with an embodiment of the invention. Referring to FIG. 1, there is shown communication system 100. The communication system comprises a plurality of GNSS satellites, of which GNSS satellites 110a-110d are illustrated, and a multi-standard GNSS receiver 120.

A GNSS satellite such as the GNSS satellite 110a may comprise suitable logic, circuitry, interfaces and/or code that is operable to provide satellite navigational information to various GNSS receivers on earth. The GNSS satellite 110a may be operable to broadcast its own ephemeris periodically. In instances where the GNSS satellite 110a is a GPS satellite, the GNSS satellite 110a may broadcast GPS ephemeris once every 30 seconds taking 18 seconds in all for a complete ephemeris transmission. In instances where the GNSS satellite 110a is a GLONASS satellite, the GNSS satellite 110a may broadcast GLONASS ephemeris once every 30 seconds taking 8 seconds in all for a complete ephemeris transmission. The broadcast ephemeris may be utilized to calculate navigation information such as, for example, position, velocity, and clock information of GNSS receivers such as the GNSS receiver 120. The GNSS satellite 110a may be operable to update ephemeris, for example, every two hours. The broadcast ephemeris may be valid for a limited time period such as, for example, 2 to 4 hours into the future (from the time of broadcast).

The multi-standard GNSS receiver 120 may comprise suitable logic, circuitry, interfaces and/or code that are operable to receive satellite broadcast signals from a plurality of visible GNSS satellites such as the GNSS satellites 110a through 110d. As illustrated in FIG. 1, the multi-standard GNSS receiver 120 may comprise a GPS receiver 121, a GLONASS receiver 122, a GALILEO receiver 123, a COMPASS receiver 124, a QZSS receiver 125, a memory 126 and a processor 127. The multi-standard GNSS receiver 120 may be operable to receive and track satellite signals broadcast from different GNSS satellites such as, for example, GPS, GALILEO, GLONASS, COMPASS and/or QZSS satellites. The multi-standard GNSS receiver 120 may comprise other GNSS receivers for other GNSS systems. The received GNSS signals may comprise ephemeris or ephemeris data of related transmitting GNSS satellites. The ephemeris may comprise satellite navigational information such as satellite orbits models and/or clock models of the related transmitting GNSS satellites. The received satellite signals, whether GPS, GLONASS, GALILEO, COMPASS, QZSS or some other GNSS satellite signals, may be processed via the processor 127 to extract corresponding ephemeris.

The processor 127 may calculate instantaneous locations-in-space of the related transmitting GNSS satellites utilizing satellite navigational information in the corresponding extracted ephemeris. The processor 127 may estimate navigation information for the multi-standard GNSS receiver 120 from the calculated instantaneous locations-in-space of the related transmitting GNSS satellites. The estimated navigation information for the multi-standard GNSS receiver 120 may comprise a position fix and/or a velocity of the multi-standard GNSS receiver 120. The multi-standard GNSS receiver 120 may be integrated within or externally coupled to GNSS capable devices 120a-120d. The estimated navigation information for the multi-standard GNSS receiver 120 may be utilized to support various location-based client applications such as, for example, emergency calling, running on the GNSS capable devices 120a-120d.

In operation, the multi-standard GNSS receiver 120 may receive a plurality of satellite signals from the GNSS satellites 110a-110d. The multi-standard GNSS receiver 120 may perform a satellite search process to identify corresponding transmitting GNSS satellites for the received satellite signals.

A GNSS satellite may be identified in various ways depending on satellite type. For example, a GLONASS satellite may be identified by its satellite vehicle identification number (SV.sub.-ID) acquired from the GLONASS almanac data which may be related to the carrier transmission frequency of the GLONASS satellite. A GPS satellite may be identified by matching or correlating a unique portion of the GPS PRN-code for that particular satellite. Once a synchronization or lock has been successfully established on the transmitting GPS satellites and/or GLONASS satellites, the multi-standard GNSS receiver 120 may extract the GPS ephemeris and the GLONASS ephemeris from the received GPS and GLONASS satellite signals, respectively. In some instances, information about satellite broadcast cycles for various GNSS satellites such as GPS, GALILEO, GLONASS, COMPASS and/or QZSS satellites may be, for example, programmed into the memory 126 of the multi-standard GNSS receiver 120. In this regard, the satellite broadcast cycle information may comprise satellite broadcast periods and/or ephemeris transmission time. For example, for the GPS system, it takes 18 seconds for a complete or full GPS ephemeris transmission, which is repeated every 30 seconds. For the GLONASS system, it takes 8 seconds for a complete or full GLONASS ephemeris transmission, which is repeated every 30 seconds. In some instances, the multi-standard GNSS receiver 120 may comprise or have access to a real time clock (RTC) 128. The RTC 128 may be enabled to capture or record time instants upon identifying a request for ephemeris acquisition. In this regard, the multi-standard GNSS receiver 120 may have knowledge of a current time instant immediately upon startup by means of the RTC 128. The multi-standard GNSS receiver 120 is considered to operate in a "warm start" in the circumstance where a time instant is available for the multi-standard GNSS receiver 120 upon startup. In other instances, the multi-standard GNSS receiver 120 may not comprise the RTC 128 or may have no access to the RTC 128. The multi-standard GNSS receiver 120 may have no knowledge of a current time instant upon startup. In this case, the multi-standard GNSS receiver 120 is considered to operate in a "cold start".

In an embodiment of the invention, assuming that the multi-standard GNSS receiver 120 operates in a "warm start". The multi-standard GNSS receiver 120 may have knowledge of a current time instant immediately upon startup via the RTC 128, for example. In instances where a need for ephemeris acquisition is identified at a specific time instant such as a current time instant, the multi-standard GNSS receiver 120 may be operable to determine with respect to the specific time instant when to start satellite search and which satellite system to be utilized based on the satellite broadcast cycle information for satellites in same GNSS and/or satellites in different GNSSs. In other words, the multi-standard GNSS receiver 120 may determine the earliest time at which the multi-standard GNSS receiver 120 may start downloading or acquiring fresh broadcast ephemeris from a certain GNSS system. For example, upon being turned ON at the current time instant, the multi-standard GNSS receiver 120 in a "warm start" may be operable to determine or identify the earliest timing for acquiring the fresh broadcast ephemeris, with respect to the current time instant and a corresponding GNSS satellite system, based on the satellite broadcast cycle information. The multi-standard GNSS receiver 120 may synchronize or lock onto the determined GNSS satellite such as a GPS satellite to receive or acquire fresh broadcast ephemeris from satellite signals received at the identified earliest timing. The multi-standard GNSS receiver 120 may extract fresh broadcast GPS ephemeris from the received GPS signals to calculate its own first position. In instances where the GLONASS system is identified for satellite search at the determined earliest timing, the multi-standard GNSS receiver 120 may enable or utilize the GLONASS receiver 122 to receive or acquire GLONASS satellite signals at the determined earliest timing. The multi-standard GNSS receiver 120 may extract fresh broadcast GLONASS ephemeris from the received GLONASS signals to calculate its own first position.

In an embodiment of the invention, assuming that the multi-standard GNSS receiver 120 operates in a "cold start". The multi-standard GNSS receiver 120 may have no knowledge of a current time instant immediately upon startup. In instances where a need for ephemeris acquisition is identified, the multi-standard GNSS receiver 120 in a "cold start" may start satellite search with no regard of ephemeris broadcast timing. Once a GNSS satellite is acquired and tracked, the multi-standard GNSS receiver 120 may determine a current time instant from information embedded in the navigation data sequence broadcast by the acquired GNSS satellite. The multi-standard GNSS receiver 120 may then prioritize GNSS satellite searching with respect to the determined current time and knowledge of different GNSS broadcast cycles.

In an exemplary embodiment of the invention, when comparing a current time instant to the GLONASS or GPS timing, the multi-standard GNSS receiver 120 may provide a guard band time in order to ensure that the multi-standard GNSS receiver 120 may have adequate time to find and acquire satellites before the beginning of the next ephemeris broadcast. The guard band time may vary from just a second or two to ten or more seconds depending on the capability of the multi-standard GNSS receiver 120.

In an embodiment of the invention, the multi-standard GNSS receiver 120 may be operable to optimize satellite search by prioritizing a manner in which the fresh broadcast ephemeris is acquired from the different GNSS systems (GNSSs). In this regard, the multi-standard GNSS receiver 120 may prioritize one satellite system versus another satellite system based on the corresponding satellite broadcast cycle information and a given time instant at which a need or request for ephemeris acquisition is identified. For example, upon being turned ON at a specific time instant, the multi-standard GNSS receiver 120 needs to synchronize or lock onto GNSS satellites in order to acquire fresh GNSS ephemeris. In this regard, the multi-standard GNSS receiver 120 may compare the satellite broadcast cycle information with the specific time instant to determine a satellite search order. The multi-standard GNSS receiver 120 may search for signals from satellites in the same GNSSs and satellites for the different GNSSs based on the determined search order. For example, the multi-standard GNSS receiver 120 may assign or search for GNSS satellites in the different GNSSs based on the determined satellite search order to accelerate the availability of fresh ephemeris. More specifically, a GNSS satellite system with a next broadcast cycle closer to the specific time instant may be searched earlier.

In an embodiment of the invention, in some circumstances, a GNSS receiver such as the GPS receiver may receive GPS ephemeris utilizing different GPS channels. In this regard, the multi-standard GNSS receiver 120 may be operable to optimize satellite search for the GPS system by prioritizing one GNSS channel versus another based on the corresponding GPS satellite broadcast cycle information and a given time instant. For example, upon being turned ON at a specific time instant, the multi-standard GNSS receiver 120 needs to synchronize or lock onto one or more GPS channels of the GPS system in order to acquire GPS ephemeris. In this regard, the multi-standard GNSS receiver 120 may compare the GPS satellite broadcast cycle information with the specific time instant to determine a satellite search order for the GPS system. The determined satellite search order may be utilized by the multi-standard GNSS receiver 120 to assign GPS channels in such a way as to accelerate the acquisition of GPS ephemeris.

Figure 2:
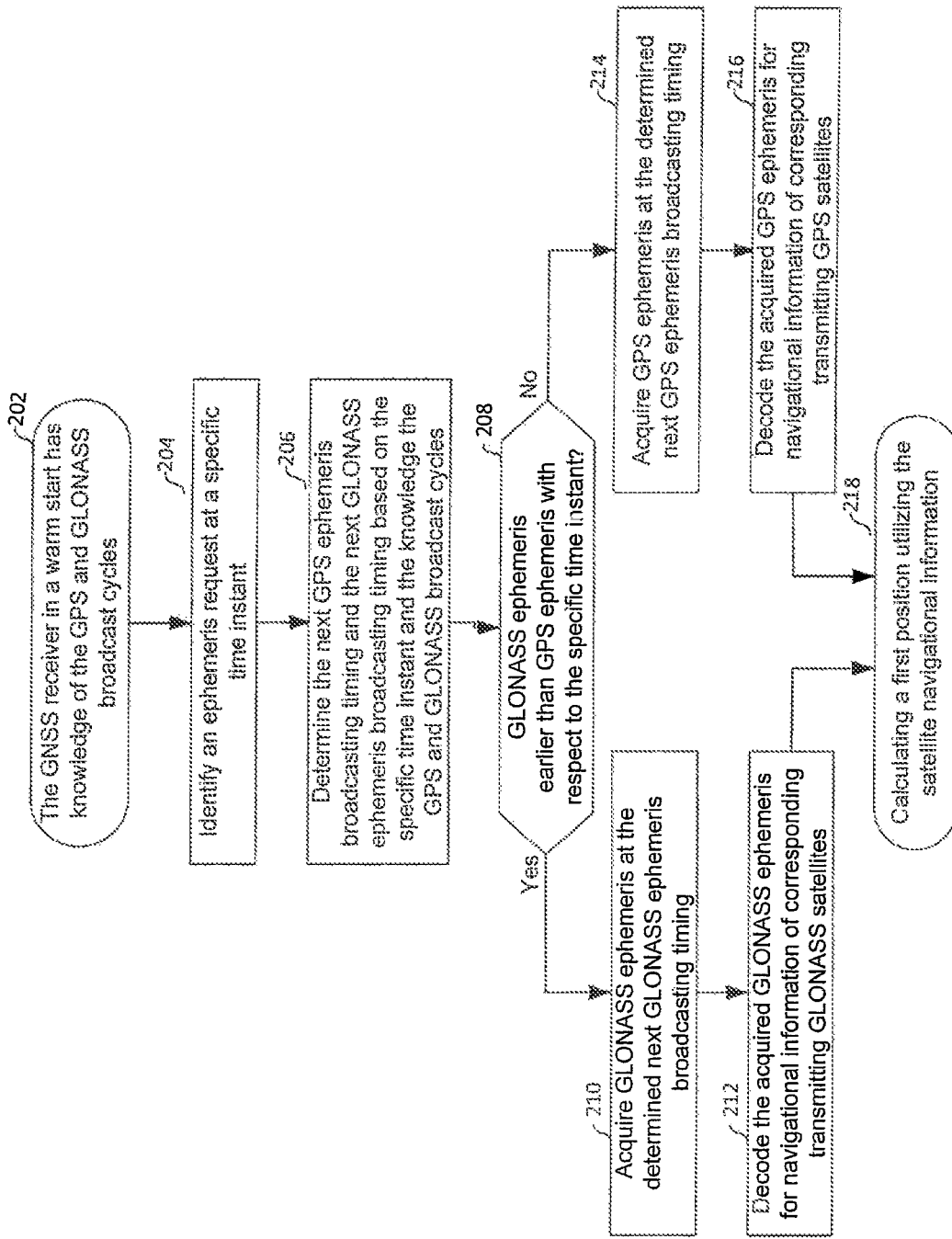
FIG. 2 is a flow chart illustrating exemplary steps that may be performed by a multi-standard GNSS receiver in a warm start to reduce autonomous time to fix, in accordance with an embodiment of the invention.

FIG. 2 is a flow chart illustrating exemplary steps that may be performed by a multi-standard GNSS receiver in a warm start to reduce autonomous time to fix, in accordance with an embodiment of the invention. Referring to FIG. 2, the exemplary steps may begin with step 202, in which the multi-standard GNSS receiver 120, comprising, for example, the GPS receiver 121 and the GLONASS receiver 122, may be OFF. Assuming that the multi-standard GNSS receiver 120 operates in a "warm start". The multi-standard GNSS receiver 120 possesses knowledge of the GPS and GLONASS broadcast cycles. In step 204, the multi-standard GNSS receiver 120 may identify, through turning on the multi-standard GNSS receiver 120, a request for ephemeris at a specific time instant. In step 206, the multi-standard GNSS receiver 120 may determine the next broadcast timing for the GPS ephemeris and the GLONASS ephemeris, respectively, based on the specific time instant and the knowledge of the GPS and GLONASS broadcast cycles. In step 208, it may be determined whether the GLONASS ephemeris may be transmitted to the multi-standard GNSS receiver 120 earlier than the GPS ephemeris with respect to the specific time instant. In instances where the GLONASS ephemeris is transmitted to the multi-standard GNSS receiver 120 earlier than the GPS ephemeris with respect to the specific time instant, then in step 210, the multi standard GNSS receiver 120 may enable the GLONASS receiver 122 to acquire or download the GLONASS ephemeris according to the determined next GLONASS ephemeris broadcast timing. In step 212, the GLONASS receiver 122 may decode the acquired GLONASS ephemeris for satellite navigational information of corresponding transmitting GLONASS satellites. In step 218, the multi-standard GNSS receiver 120 may calculate its own first position utilizing the satellite navigational information.

In step 208, in instances where the UPS ephemeris is transmitted to the multi-standard GNSS receiver 120 earlier than the GLONASS ephemeris with respect to the specific time instant, then in step 214, the multi-standard GNSS receiver 120 may enable the GPS receiver 121 to acquire or download the GPS ephemeris according to the determined next GPS ephemeris broadcast timing. In step 216, the GPS receiver 121 may decode the acquired GPS ephemeris for satellite navigational information of corresponding transmitting GPS satellites. The exemplary steps may continue in step 218.

Figure 3:
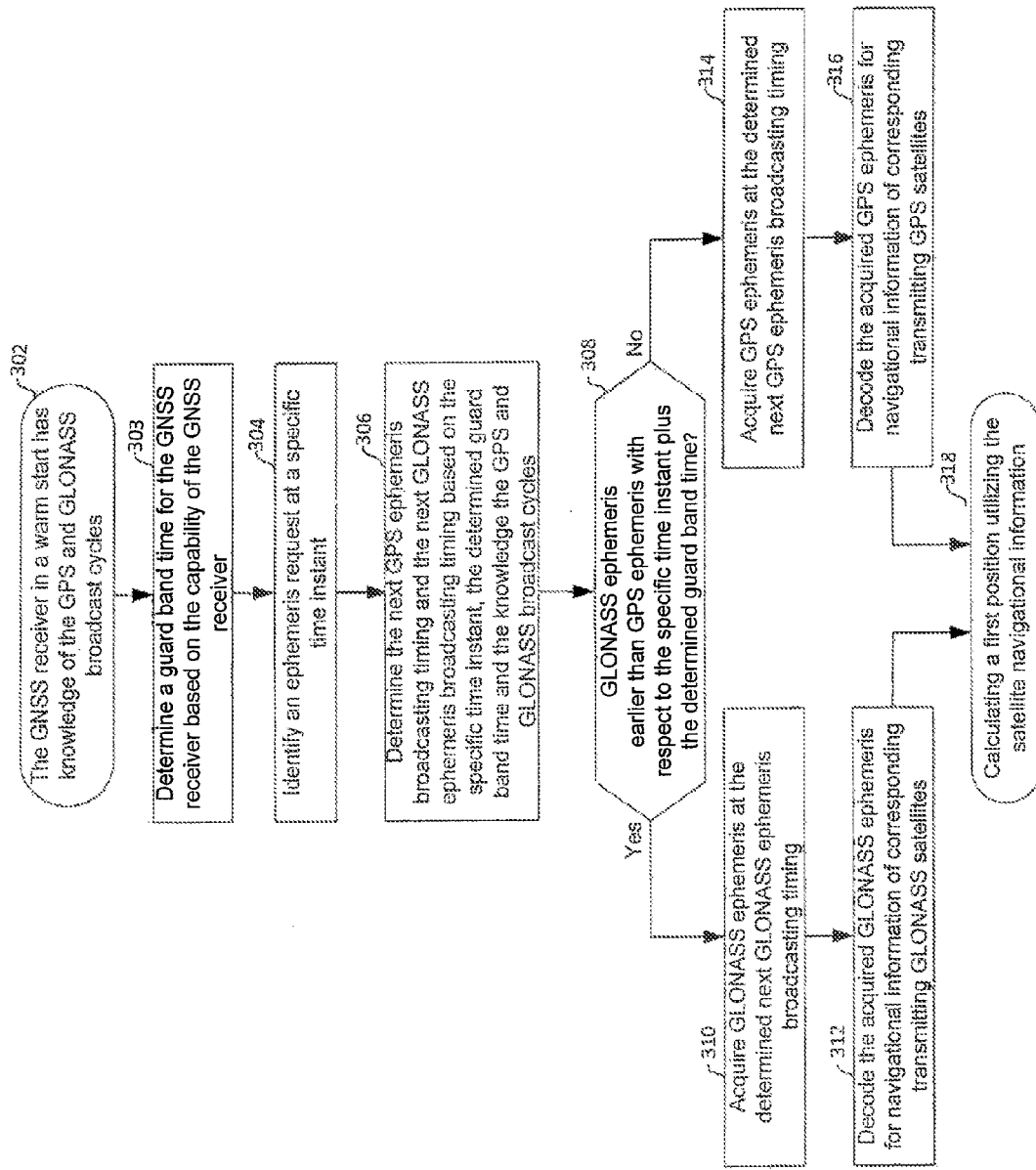
FIG. 3 is a flow chart illustrating exemplary steps that may be performed by a multi-standard GNSS receiver to provide a guard band time for satellite search, in accordance with an embodiment of the invention.

FIG. 3 is a flow chart illustrating exemplary steps that may be performed by a multi-standard GNSS receiver to provide a guard band time for satellite search, in accordance with an embodiment of the invention. Referring to FIG. 3, the exemplary steps may begin with step 302, in which the multi-standard GNSS receiver 120, comprising, for example, the GPS receiver 121 and the GLONASS receiver 122, may be OFF. Assuming that the multi-standard GNSS receiver 120 operates in a "warn start". The multi-standard GNSS receiver 120 possesses knowledge of the GPS and GLONASS broadcast cycles. In step 303, the multi-standard GNSS receiver 120 may determine a guard band time based on its own capability. In step 304, the multi-standard GNSS receiver 120 may identify, through turning ON the multi-standard GNSS receiver 120, a request for ephemeris at a specific time instant. In step 306, the multi-standard GNSS receiver 120 may determine the next broadcast timing for the GPS ephemeris and the GLONASS ephemeris, respectively, based on the specific time instant and the knowledge of the GPS and GLONASS broadcast cycles. In step 308, it may be determined whether the GLONASS ephemeris may be transmitted to the multi-standard GNSS receiver 120 earlier than the GPS ephemeris with respect to the specific time instant plus the determined guard band time. In instances where the GLONASS ephemeris is transmitted to the multi-standard GNSS receiver 120 earlier than the GPS ephemeris with respect to the specific time instant plus the determined guard band time, then in step 310, the multi-standard GNSS receiver 120 may enable the GLONASS receiver 122 to acquire or download the GLONASS ephemeris according to the determined next GLONASS ephemeris broadcast timing. In step 312, the GLONASS receiver 122 may decode the acquired GLONASS ephemeris for satellite navigational information of corresponding transmitting GLONASS satellites. In step 318, the multi-standard GNSS receiver 120 may calculate its own first position utilizing the satellite navigational information.

In step 308, in instances where the GPS ephemeris is transmitted to the multi-standard GNSS receiver 120 earlier than the GLONASS ephemeris with respect to the specific time instant plus the determined guard band time, then in step 314, the multi-standard GNSS receiver 120 may enable the GPS receiver 121 to acquire or download the GPS ephemeris according to the determined next GPS ephemeris broadcast timing. In step 316, the GPS receiver 121 may decode the acquired GPS ephemeris for satellite navigational information of corresponding transmitting GPS satellites. The exemplary steps may continue in step 318.

Figure 4:
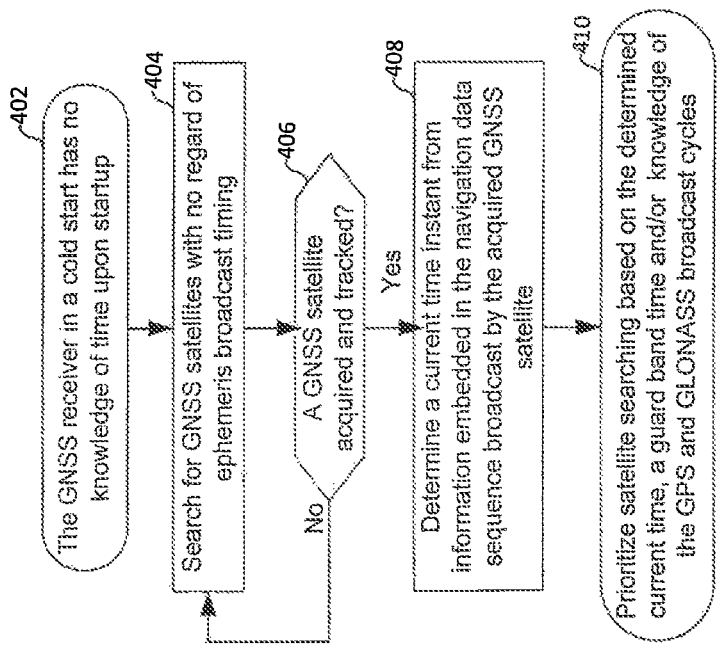
FIG. 4 is a flow chart illustrating exemplary steps that may be performed by a multi-standard GNSS receiver in a cold start to reduce autonomous time to fix, in accordance with an embodiment of the invention.

FIG. 4 is a flow chart illustrating exemplary steps that may be performed by a multi-standard GNSS receiver in a cold start to reduce autonomous time to fix, in accordance with an embodiment of the invention. Referring to FIG. 4, the exemplary steps may begin with step 402, in which the multi-standard GNSS receiver 120, comprising, for example, the GPS receiver 121 and the GLONASS receiver 122, may be OFF. Assuming that the multi-standard GNSS receiver 120 operates in a "cold start", The multi-standard GNSS receiver 120 possesses knowledge of the GPS and GLONASS broadcast cycles. In step 404, the multi-standard GNSS receiver 120 may, upon turning on, may start searching for GNSS satellites with no regard of ephemeris broadcast timing. In step 406, it may be determined if a GNSS satellite is acquired and tracked. In instances where a GNSS satellite is acquired and tracked by the multi-standard GNSS receiver 120, then in step 408, where multi-standard GNSS receiver 120 may determine a current time instant from information embedded in the navigation data sequence broadcasted by the acquired GNSS satellite. In step 410, the multi-standard GNSS receiver 120 may prioritize satellite searching based on the determined current time, a guard band time and/or knowledge of the GPS and GLONASS broadcast cycles. In step 406, in instances where no GNSS satellite is acquired and tracked by the multi-standard GNSS receiver 120, the exemplary steps returns back to step 404.

Various aspects of a method and system for reducing autonomous time to fix performance of a GNSS receiver are provided. In various exemplary embodiments of the invention, a multi-standard GNSS receiver such as the multi-standard GNSS receiver 120 may be communicatively coupled with various different satellite receivers such as the GPS receiver 121, the GLONASS receiver 122, the GALILEO receiver 123, the COMPASS receiver 124, and/or the QZSS receiver 125. The multi-standard GNSS receiver 120 may be operable to receive corresponding satellite signals from different GNSS satellite systems (GNSSs). The multi-standard GNSS receiver 120 may determine with respect to a specific time instant such as a current time instant, the earliest ephemeris broadcast timing for acquiring fresh broadcast ephemeris from one of the plurality of different GNSSs based on corresponding satellite broadcast cycles for satellites in the different GNSSs. The multi-standard GNSS receiver 120 may receive or acquire fresh broadcast ephemeris at the identified earliest ephemeris broadcast timing. The acquired fresh broadcast ephemeris may be utilized to determine or calculate a first position for the multi-standard GNSS receiver 120.

The multi-standard GNSS receiver 120 may operate in a "warm start" or in a "cold start". The multi-standard GNSS receiver 120 in a "warm start" may have knowledge of a current time instant immediately upon startup via the RTC 128, for example. However, the multi-standard GNSS receiver 120 in a "cold start" may have no knowledge of a current time instant immediately upon startup. In this regard, the multi-standard GNSS receiver 120 in a "cold start", upon turning on, may start searching for GNSS satellites with no regard of ephemeris broadcast timing. In instances where the multi-standard GNSS receiver 120 acquires and tracks a GNSS satellite, the multi-standard GNSS receiver 120 may determine a current time instant from information embedded in the navigation data sequence broadcasted by the acquired GNSS satellite.

A search order may be determined for the multi-standard GNSS receiver 120 based on the corresponding satellite broadcast cycles and the current time instant. The multi-standard GNSS receiver 120 may selectively utilize or trigger appropriate satellite receivers such as the GPS receiver 121 and the GLONASS receiver 122 to search for signals from the satellites in the different GNSSs based on the determined search order. The satellite broadcast cycles may be associated with channels for different GNSS satellite systems. In this regard, the multi-standard GNSS receiver 120 may be operable to scan the channels to identify one or more transmitting GNSS satellite based on the corresponding satellite broadcast cycles. The multi-standard GNSS receiver 120 may synchronize or lock onto the identified one or more transmitting GNSS satellite to download corresponding fresh broadcast ephemeris. The downloaded fresh broadcast ephemeris may be utilized by the multi-standard GNSS receiver 120 to determine or calculate its own first position. In some instances, the multi-standard GNSS receiver 120 may compare the current time instant with the corresponding satellite broadcast cycles to prioritize or optimize a manner in which the fresh broadcast ephemeris is acquired from the satellites in the different GNSSs. In instances where a guard band time is provided to ensure that the multi-standard GNSS receiver 120 may have adequate time to find and acquire satellites before the beginning of the next ephemeris broadcast, the multi-standard GNSS receiver 120 may compare the current time instant plus the guard band time with the corresponding satellite broadcast cycles to prioritize satellite search.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for reducing autonomous time to fix performance of a GNSS receiver.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals in a multi-standard global navigation satellite system (GNSS) receiver associated with a plurality of global navigation satellite systems, the method comprising:
    determining a search order for a plurality of satellites included in the plurality of global navigation satellite systems based on a current time instant and satellite broadcast cycles of the plurality of satellites;
    searching among the plurality of satellites in accordance with the determined search order to identify a satellite from among the plurality of satellites from which ephemeris data is to be received based on the current time instant and on the satellite broadcast cycles;
    acquiring the ephemeris data from the identified satellite; and
    determining a position of the GNSS receiver based on the acquired ephemeris data.

2. The method of claim 1, wherein the determining the search order comprises:
    searching for signals from the plurality of satellites based on the satellite broadcast cycles.

3. The method of claim 2, wherein the searching for the signals from the plurality of satellites comprises:
    searching for the signals utilizing another receiver.

4. The method of claim 1, further comprising:
    scanning a plurality of channels associated with the plurality of satellites to enable the searching.

5. The method of claim 1, wherein the searching comprises:
    determining, with respect to the current time instant, an earliest broadcast time when the ephemeris data can be received from the identified satellite.

6. The method of claim 1, wherein the searching comprises:
    providing a guard band time to ensure adequate time for searching the plurality of satellites.

7. The method of claim 6, wherein the identifying the satellite further comprises:
    comparing the current time instant and the guard band time to a time associated with the satellite broadcast cycles to enable the searching.

8. The method of claim 1, further comprising:
    prioritizing a first global navigation satellite system, from among the plurality of global navigation satellite systems, over a second global navigation satellite system, from among the plurality of global navigation satellite systems, based on a determination that a next broadcast cycle associated with a first satellite included in the first global navigation satellite system is closer to the current time instant with respect to a next broadcast cycle associated with a second satellite included in the second global navigation satellite system.

9. The method of claim 1, further comprising:
    determining the current time instant based on navigation data acquired from one of the plurality of satellites or from a clock associated with the GNSS receiver.

10. An apparatus for processing signals in a multi-standard global navigation satellite system (GNSS) receiver associated with a plurality of global navigation satellite systems, the apparatus comprising:
    a processor configured to:
        determine a search order for a plurality of satellites included in the plurality of global navigation satellite systems based on a current time instant and satellite broadcast cycles of the plurality of satellites;
        search among the plurality of satellites in accordance with the determined search order to identify a satellite from among the plurality of satellites from which ephemeris data is to be received based on the current time instant and on the satellite broadcast cycles;
        acquire the ephemeris data from the identified satellite; and
        determine a position of the GNSS receiver based on the acquired ephemeris data.

11. The apparatus of claim 10, wherein the processor is configured to search for signals from the plurality of satellites based on the satellite broadcast cycles to determine the search order.

12. The apparatus of claim 11, wherein the processor is configured to utilize another receiver to search for the signals.

13. The apparatus of claim 10, wherein the processor is further configured to:
    scan a plurality of channels associated with the plurality of satellites to enable the processor to search from among the plurality of satellites.

14. The apparatus of claim 10, wherein the processor is further configured to determine, with respect to the current time instant, an earliest broadcast time when the ephemeris data can be received from the identified satellite.

15. The apparatus of claim 10, wherein the processor is further configured to provide a guard band time to ensure adequate time to search the plurality of satellites.

16. The apparatus of claim 15, wherein the processor is configured to compare the current time instant and the guard band time to a time associated with the satellite broadcast cycles to enable the processor to search the plurality of satellites.

17. The apparatus of claim 10, wherein the processor is configured to prioritize a first global navigation satellite system, from among the plurality of global navigation satellite systems, over a second global navigation satellite system, from among the plurality of global navigation satellite systems, based on a determination that a next broadcast cycle associated with a first satellite included in the first global navigation satellite system is closer to the current time instant with respect to a next broadcast cycle associated with a second satellite included in the second global navigation satellite system.

18. The apparatus of claim 10, wherein the processor is further configured to determine the current time instant based on navigation data acquired from one of the plurality of satellites or from a clock associated with the GNSS receiver.

19. The method of claim I, wherein the acquiring comprises:
 synchronizing or locking onto the identified satellite to acquire the ephemeris data from the identified satellite.

20. The apparatus of claim 10, wherein the processor is further configured to synchronize or lock onto the identified satellite to acquire the ephemeris data from the identified satellite.

\* \* \* \* \*